US008085654B2

(12) United States Patent
Capello et al.

(10) Patent No.: US 8,085,654 B2
(45) Date of Patent: Dec. 27, 2011

(54) METHOD FOR REDUCING FAULT DETECTION TIME IN A TELECOMMUNICATION NETWORK

(75) Inventors: Alessandro Capello, Turin (IT); Claudio Merulla, Turin (IT); Vinicio Vercellone, Turin (IT)

(73) Assignee: Telecom Italia S.p.A., Milan (IT)

( * ) Notice: Subject to any disclaimer, the term of this patent is extended or adjusted under 35 U.S.C. 154(b) by 417 days.

(21) Appl. No.: 12/086,973

(22) PCT Filed: Dec. 23, 2005

(86) PCT No.: PCT/EP2005/013995
§ 371 (c)(1),
(2), (4) Date: Jun. 23, 2008

(87) PCT Pub. No.: WO2007/073752
PCT Pub. Date: Jul. 5, 2007

(65) Prior Publication Data
US 2009/0109862 A1 Apr. 30, 2009

(51) Int. Cl.
*G01R 31/08* (2006.01)
(52) U.S. Cl. ........................................ 370/216; 370/242
(58) Field of Classification Search .......... 370/216–228, 370/241–249
See application file for complete search history.

(56) References Cited

U.S. PATENT DOCUMENTS

| 6,301,224 | B1 | 10/2001 | Rijhsinghani et al. |
| 6,515,967 | B1 * | 2/2003 | Wei et al. ....................... 370/244 |
| 6,763,190 | B2 * | 7/2004 | Agrawal et al. ................... 398/5 |
| 6,950,427 | B1 | 9/2005 | Zinin |
| 7,644,317 | B1 * | 1/2010 | Sajassi et al. ................... 714/43 |
| 2005/0018667 | A1 | 1/2005 | Chandra et al. |

FOREIGN PATENT DOCUMENTS
WO WO 2004/028102 A1 4/2004

OTHER PUBLICATIONS

Retana, A. et al., "Multi Acess Reachability Protocol (MARP)," Cisco Systems, Inc., Network Working Group, Internet Draft, pp. 1-13, (Mar. 2003).

* cited by examiner

*Primary Examiner* — Phuc Tran
(74) *Attorney, Agent, or Firm* — Finnegan, Henderson, Farabow, Garrett & Dunner, L.L.P.

(57) ABSTRACT

A method for reducing fault detection time in a network includes routers configured to exchange messages via at least one switch to check mutual reachability, each message including a list of routers reachable from the sending router. The method includes snooping, by the switch, a message from a router to extract the list of routers reachable from the router; and, when a network fault occurs that prevents the router from being reachable via the switch, sending, by the switch and to all the other routers connected to the switch, a network fault message including an empty list of routers, so that the receiving routers, not seeing their own identifier in the list, declare the adjacency with the sending router closed, and proceed to reroute traffic on a new route.

17 Claims, 4 Drawing Sheets

| INTERFACE IDENTIFIER | MAC ADDRESS OF ROUTER | COPY OF LAST "HELLO" MESSAGE RECEIVED |
|---|---|---|
| $I_1$ | $MAC_A$ | "HELLO"$_A$ |
| $I_2$ | $MAC_C$ | "HELLO"$_C$ |
| $I_3$ | $MAC_E$ | "HELLO"$_E$ |
| $I_3$ | $MAC_F$ | "HELLO"$_F$ |

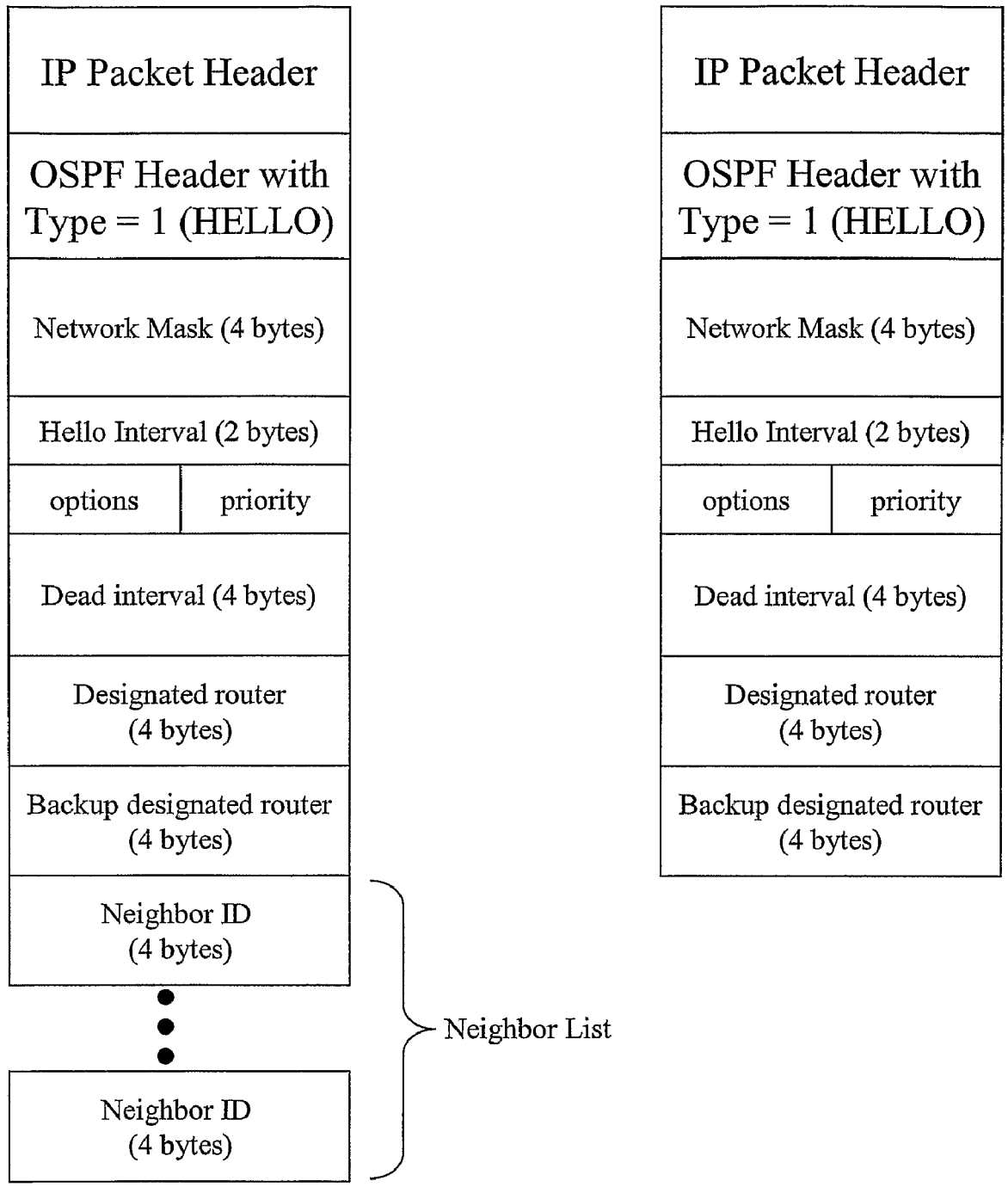

METHOD FOR REDUCING FAULT DETECTION TIME IN A TELECOMMUNICATION NETWORK

CROSS REFERENCE TO RELATED APPLICATION

This application is a national phase application based on PCT/EP2005/013995, filed Dec. 23, 2005.

TECHNICAL FIELD OF THE INVENTION

The present invention relates to a method for reducing fault detection time in a telecommunication network.

BACKGROUND ART

As is known, modern telematic networks based on the Internet Protocol (IP), such as the Internet network, henceforth referred to as IP networks, nowadays constitute the telecommunications infrastructure on which an ever-increasing number of services and applications are destined to converge. Many of the new applications, such as voice (VoIP, Voice over IP) and video communications, require high levels of reliability and availability that translate into increasingly pressing requirements regarding the performance of network safety mechanisms in the case of a fault. The protocols of the Internet Suite can be used to implement widespread communications, via a group of individual networks, different for the type of technology used, in particular both of local type (Local Area Networks—LAN) and of geographical type (Wide Area Networks—WAN), which are interconnected in various ways to form what, as a whole, is typically called an internetwork.

The IP networks or internetworks are thus created via the interconnection of various subnetworks, through devices called routers, which are capable of forwarding data packets to the destination network based on the address contained within them.

With reference to the Open System Interconnection (OSI) model, routers process data packets at Layer 3 (Network Layer) and implement the transfer of information (routing) from the source to the destination via the IP network. To reach the destination, data packets generally pass through one or more intermediate nodes (routers), each of which determines, based on the contents of its own routing table, which is the next router (generally known as next hop) to which data packet are to be forwarded in order to reach the final destination. The look-up in the routing table for the next hop to use involves running a so-called "longest match" process on the address prefixes contained in routing table, using the destination IP address of the data packet being processed as the look-up key. On IP networks, routing is normally performed by using dynamic routing protocols that first acquire information of the network topology, then compute the route to the destination based on the network topology and appropriate cost metrics, and finally allow the contents of the routing table to be automatically compiled and updated.

Routers can be interconnected via several different transmission technologies, among which Local Area Networks (LAN) and Metropolitan Area Networks (MAN) represent transmission technologies of particular interest because they employ network devices which are known as switches and are widely used in the creation of data packet networks, in particular switches based on Ethernet technology. In detail, switches are devices that perform functions that, for some aspects, are similar to those performed by routers, and are used to make sub-networks that are homogeneous in terms of the technology employed. Nevertheless, unlike routers, switches process data packets at Layer 2 (Link Layer) of the OSI model, and this function is generally know as "bridging". The main difference between routers and switches is thus determined by the different "positioning" of the respective functions in the layered network architecture.

In networks including switches based on Ethernet technology, switching is managed by consulting a bridging table in which, in correspondence to the Layer 2 addresses, also known as Medium Access Control (MAC) addresses, there are specified the ports on which the respective data packets with a particular destination MAC address must be transmitted. Unlike the routing tables, the bridging tables are not compiled via routing protocols, but via learning mechanisms which are based on inspection of the MAC addresses of the received data packets, and which, in the case of unknown MAC addresses, provide for the broadcast (or flooding) transmission of the data packet on the ports.

When faults occur that involve routers or transmission links, routers must be able to detect the unreachability of the neighboring nodes and ensure the recovery of data packet forwarding, using any alternative routes that are available.

In particular, it is the task of the dynamic routing to recompute the routes, based on the new network typology, to determine an alternative routing for the data traffic affected by the fault. In order to guarantee limited service inefficiency, especially for services characterized by more stringent requirements, such as VoIP services, it is necessary to minimize rerouting time, in particular the time needed to complete the convergence process of the routing protocol.

Rapid convergence of the routing protocol can be achieved only by promptly identifying the occurrence of a fault, or rather the unreachability of a neighboring router.

In order to do so, routing protocols utilize the periodic exchange of appropriate messages, generally known as "hello" messages, for checking the reachability of neighboring routers, and fault detection time depends on the frequency of the "hello" messages. However, this frequency cannot easily be increased due to the processing load that the management of the "hello", messages involves and the additional traffic on the network. Typically, the generation frequency of the "hello" messages is set to one each ten seconds and a connectivity is declared as lost when non-reception of a predetermined number (typically four) of consecutive reply messages is detected, or when a predetermined maximum time (such as forty seconds) is passed from reception of the last message. This limitation becomes even more evident the larger the number of neighboring routers with which the "hello" messages must be exchanged.

For this reason, fault detection and notification of this event to the routing protocol is, as a rule, expediently entrusted to the lower layers, such as the physical or data link layer. This is the case of links based on SONET/SDH transmission systems or on Frame Relay or ATM virtual circuits. These connection technologies are in fact widely exploited, especially for wide-area router interconnections, and are capable of limiting the fault detection time, reducing the overall routing protocol convergence time.

The case in which the routers are connected via local area networks, such as Ethernet, is different. Due to its characteristics of simplicity of use and low cost, the use of this technology is widespread, especially for local connections.

FIG. 1 shows an example of traffic rerouting in a multi-access local network with one Ethernet switch. The configuration shown in general terms in FIG. 1 corresponds to a typical situation that occurs in some scenarios of practical interest. A typical application in this respect can be found in the context of the structure of a Point Of Presence (POP), i.e. a node of a Service Provider's IP backbone network, in order to create an interconnection, inside the POP, between routers belonging to different levels of the network structure. In this context, routers A and B may perform the link functions (gateway) to the external networks of other Service Providers or to the Internet network, while routers E and D may belong to the backbone transit segment, i.e. they terminate the wide-area connections with other POPs. A similar configuration may also be used for interconnecting Service Provider's access routers E and D, which terminate client links, with the transit routers A and B. Another possible practical application of this layout is represented by the collection and aggregation of the traffic, in local environments or distributed on a metropolitan/regional scale, of client access devices for their interconnection to the POP's routers.

With reference to FIG. 1, in normal conditions router A reaches router F via route i including link $L_{AC}$, switch C, link $L_{EC}$, router E, and link $L_{EF}$. A fault involving link $L_{EC}$ causes loss of traffic originating from router A until it is rerouted. However, switch C has no way of informing router A of the fault, and therefore router A detects the fault only after losing a number of "hello" messages, with a consequent loss of traffic for at least thirty seconds (using default values). Once unreachability of router E is detected, the routing algorithm running in router A recomputes a new route j, via router D, on which the traffic directed to router F can be rerouted.

This routing inefficiency is due to the fact that switch C is not configured to propagate information regarding the state of its own interfaces to the routers, and hence the routers must rely exclusively on the "hello" messages generated by the routing protocol.

For this reason, the need is felt for solutions that allow more rapid and efficient detection of loss of reachability between neighboring routers in the network, for routing protocol purposes, which are interconnected via a local network Layer 2 switch.

The Internet-Draft "MultiAccess Reachability Protocol (MARP)" of A. Retana and R. White, submitted on March 2003 for the Network Working Group of the Internet Engineering Task Force (IETF), describes a Multiaccess Reachability Protocol (MARP) that defines a protocol to quickly determine the existence or aliveness of devices attached to a shared media (broadcast) subnet, in particular, a protocol which allows for fast discovery when a device drops off of a broadcast media link for various purposes, including loss of routing protocol neighbors, and for fast notification of loss of connectivity to devices attached to such a shared media subnet. In particular, this protocol allows a router connected to a Layer 2 network switch to request the transmission of an explicit notification message when a fault occurs that causes loss of connectivity with a neighboring router, for example, on the link between a neighboring router and the network switch.

US 2005/0018667 discloses a system and method for exchanging awareness information in a network environment, including receiving a packet at a network element and identifying a sequence number included in the packet that correlates to awareness information associated with one or more adjacent network elements. A table included in the network element may be updated in order to account for the awareness information included within the packet that has not been accounted for by the network element. In cases where the awareness information included in the packet has already been accounted for, the packet may be ignored.

OBJECT AND SUMMARY OF THE INVENTION

The Applicant has observed that the known solutions, and in particular the proposed MARP protocol, are capable of reducing the fault detection time but require that both the switch and the routers in the local network implement the MARP protocol, namely that the routers implement the functionality of a MARP protocol Client, while the switches must implement the functionality of the Server. However, a solution to the fault detection problem that requires that all the routers in the local area network implement the functionality of this new protocol constitutes a restriction which turns into a limitation in the practical application of the solution.

The objective of the present invention is to provide a method and a system for reducing the delay in detecting a fault in a local area network, such as an Ethernet network, in which routers are interconnected via switches, without requiring any intervention on the routers.

For the purposes of the present invention, switches are apparatuses suitable to process data packets at Layer 2 (Link Layer) of the OSI model, while routers are apparatuses suitable to process data packets at Layer 3 (Network Layer) of the OSI model.

This objective is achieved by the present invention in that it relates to a method for reducing fault detection time in a network, to a network, and to a software product as defined in the appended claims.

The present invention achieves the aforementioned objective by configuring a network switch, which is preferably an Ethernet switch, in such a manner that it may identify the routers connected to it, putting them in relation to the physical interfaces through which they are reachable and, when a fault occurs on one or more physical links to one or more IP routers, allows all of the other routers still connected to be immediately notified of the fault occurrence, so that they can rapidly reroute traffic on alternative routes, if available.

The proposed method does not require any new functionality at IP router level and exploits the mechanisms of the routing protocols normally used on IP networks, especially those of the Link State type (OSPF and ISIS). The Ethernet switch, although not participating in the IP routing protocol together with the routers, is configured to intercept and generate routing messages. Then, the Ethernet switch, by intercepting the routing messages or through an explicit management system configuration, reconstructs the number and position of the routers directly connected to it. When a fault interrupts one or more of the links between the Ethernet switch and the routers, the switch is able to rapidly detect the fault through the Ethernet Layer 2 functions, and can send a message to all of the IP routers still connected, signaling the fault occurrence and the consequent unreachability of certain routers.

Conveniently, the "hello" messages of the routing protocol can be used to communicate this information. These "hello" messages contain a list of the IP routers neighboring on the originating router, so that each router can check mutual reachability with its neighboring routers. Therefore, the immediate closure of the routing adjacencies may be triggered, causing the traffic to be rerouted, by simply generating a "hello" message with an empty neighbor list.

In the following, the term "source router" designates a router that originates some traffic sent over a local area network to a second router attached to the same local area network, this second router being therefore designated as "destination router".

According to a first aspect thereof, the present invention thus relates to a method for reducing fault detection time in a telecommunication network including routers configured to exchange messages via at least one switch, the method comprising the steps of:

snooping, by the switch, a message from a first router, to extract information from the message; and sending, by the switch, a network fault message based on the extracted information.

Sending a network fault message preferably includes:

generating, by the switch, a fake information based on the extracted information, the fake information being such as to cause, by a second router (different from the first) receiving the message, closure of connectivity with the first router; and sending, by the switch, the network fault message including the fake information.

The extracted information preferably includes a list of routers reachable by the first router via the switch.

The fake information preferably includes an empty list of routers reachable by the first router via the switch.

Sending a network fault message may include:

detecting, by the switch, a network fault that prevents the first router from being reachable via the switch; and sending, by the switch, the network fault message when the network fault is detected.

The network fault message may be sent to all the other routers connected to the switch.

Sending a network fault message preferably also includes determining routers connected to the switch.

Determining routers connected to the switch may include:

generating a correspondence table including mappings between interfaces of the switch and routers connected to the interfaces, each mapping including an identifier of the router, an identifier of the switch interface, and a message received from the router on the switch interface.

The method may further comprise determining, by a network operator, the routers connected to the switch. Alternatively, the method may comprise determining, by the switch, the routers connected to the switch.

Generating a correspondence table may include:

snooping, by the switch, a message received from a router on a switch interface, to determine an identifier of the router;

checking, by the switch, for a mapping in the correspondence table between the router and the receiving switch interface;

if no mapping is found in the correspondence table, creating, by the switch, a new mapping in the correspondence table;

if a mapping is found in the correspondence table, replacing, by the switch, the message in the correspondence table with the received one.

Generating a correspondence table may further include:

if no message is received from a router for a given time interval, deleting, by the switch, the corresponding mapping from the correspondence table.

Sending a network fault message may include:

checking, by the switch, for mappings in the correspondence table associated with an unreachable router; and for each mapping found, sending, by the switch, a network fault message to the router in the mapping.

The network is preferably a multiaccess local area network. The multiaccess local area network is preferably an Ethernet network.

The present invention also relates to a switch for a telecommunication network, configured to implement the method according to the above.

The present invention further relates to a network including at least one switch and routers configured to exchange messages via the switch, the switch being configured to implement the method according to the above.

The present invention also relates to a software product able, when loaded and run in a switch of a network, to implement the method according to the above.

BRIEF DESCRIPTION OF THE DRAWINGS

For a better understanding of the present invention, preferred embodiments, which are intended purely by way of example and are not to be construed as limiting, will now be described with reference to the attached drawings, wherein:

FIG. 5 shows a classical "hello" message generated by a network router;

FIG. 6 shows a fake "hello" message generated by a network switch; and

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
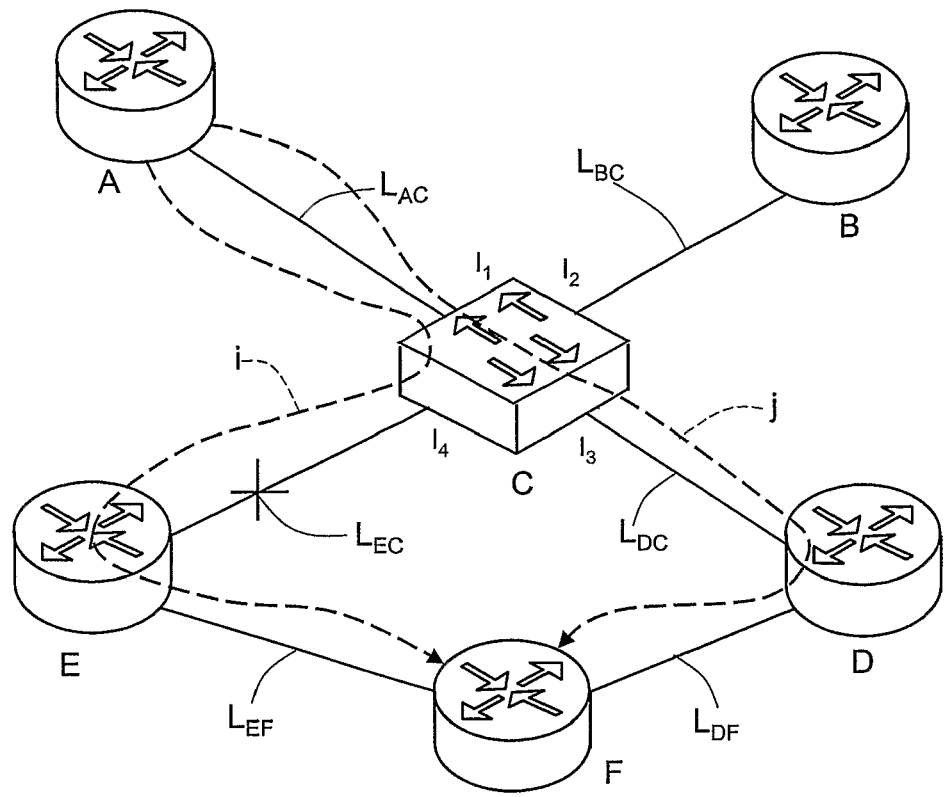
FIG. 1 shows an example of traffic rerouting in a multiaccess local network with one Ethernet switch.

Reference will be made in the following to a telecommunication network including a plurality of routers and at least a switch connecting the routers, such as the one disclosed in FIG. 1, where A, B, D, E and F are routers and C is a switch, or the one disclosed in FIG. 2, where A, C, E and F are routers and B and C are switches.

The present invention enables a network switch, in particular a Layer 2 switch such as an Ethernet switch interconnecting IP routers, whilst not directly participating in the IP routing protocol, to intercept and generate certain routing messages, according to a procedure composed of two distinct phases: a learning phase and an operating phase.

In particular, in the learning phase, the Ethernet switch reconstructs a simplified map of IP routers connected to the Ethernet local network. The objective of this phase is to allow the Ethernet switch to know which IP routers are no longer connected to the Ethernet local network in the case of a fault affecting one of its interfaces. The map created by the switch consists of an internal correspondence table storing the association (mapping) between the identifier of each router (for example the MAC address) and the identifier of the interface on the switch itself, to which the router is directly connected, or, in the case where there are a number of cascaded-connected switches, the identifier of the interface via which the router may be reached.

It is possible for the same router to be associated with more than one interface on the same Ethernet switch, but this can only happen if these interfaces belong to different virtual Local Area Networks (VLANs): in any case, the MAC address, being univocal at the global level, allows even these situations to be efficiently handled, discriminating between the various connections.

Figure 2:
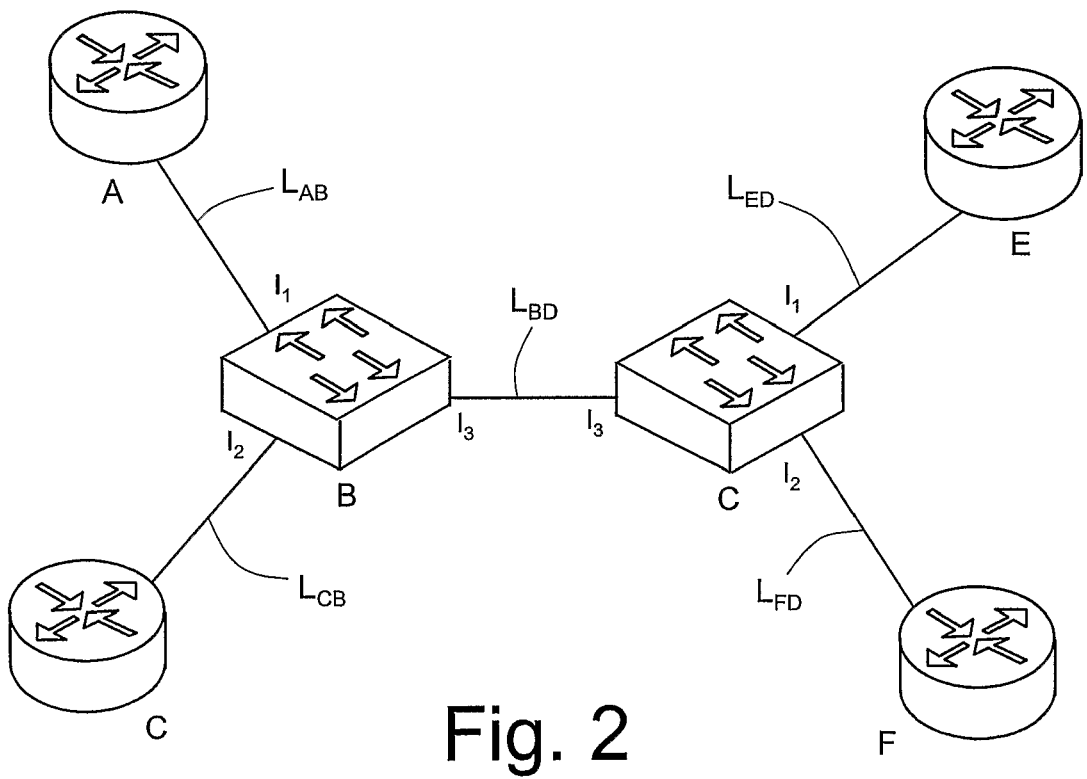
FIG. 2 shows an example of traffic rerouting in a multiaccess local network with two Ethernet switches.

For example, in the network topology shown in FIG. 2, where an Ethernet local network with two Ethernet switches B and D is shown, switch B creates a correspondence table between each one of its interfaces $I_1$, $I_2$, and $I_3$ and routers connected thereto. In particular, the correspondence table of switch B contains one line for each of the four IP routers A, C, E and F: router A is associated with interface $I_1$, router C with interface $I_2$, and routers E and F with interface $I_3$.

When the operating system of the Ethernet switch has been provided with the suitable configuration commands, the correspondence table can be explicitly configured by a network operator. This solution is however feasible only if the number of routers connected to the switch is not too high.

An alternative solution consists in leaving the Ethernet switch with the task of constructing the correspondence table. To this end, according to an aspect of the present invention, the switch inspects the content of "hello" messages passing through it and exchanged by the IP routers connected through it, and uses the information they carry to build the correspondence table. This operation of inspection (i.e., reading) of the content of "hello" messages will be herein after called "snooping".

In particular, the most widespread Link State routing protocols (OSPF and IS-IS) send "hello" packets on the Ethernet network using reserved multicast addresses as the destination:

OSPF: 0100.5E00.0005 (AllSPFRouters)
IS-IS Level 1: 0180.C200.0014 (AllL1ISs)
IS-IS Level 2: 0180.C200.0015 (AllL2ISs)

Therefore, according to an aspect of the present invention, in order to identify "hello" messages exchanged by IP routers and passing through it, the Ethernet switch intercepts data packets in "hello" messages destined to these addresses, and processes these data packets according to the following procedure.

Figures 3, 4:
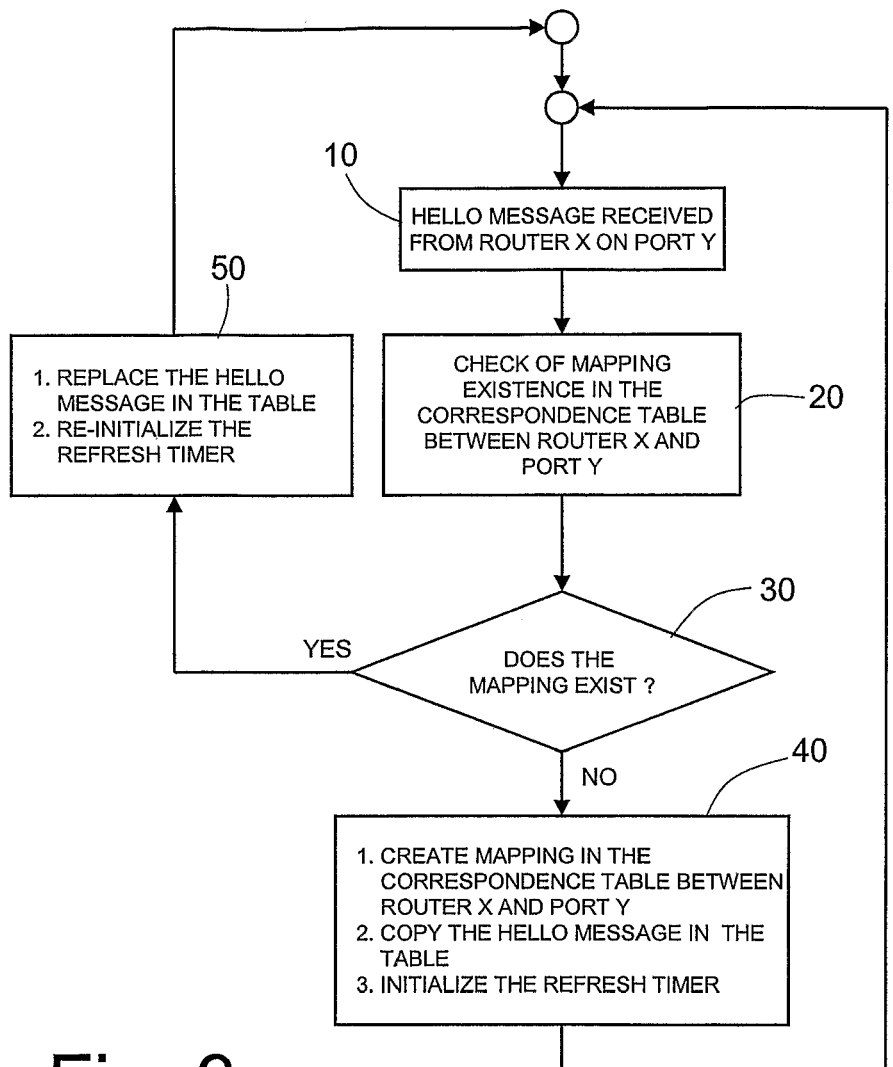
FIG. 3 shows a flowchart of a learning phase of the method according to the present invention.
FIG. 4 shows an example of a correspondence table.

A flow chart of a possible implementation of the learning phase is shown FIG. 3.

When the switch intercepts a message destined to one of the above-indicated addresses, it first carries out a syntax control in order to check that it is effectively a "hello" message (block 10), and, if so, then checks in the correspondence table for a mapping between the input interface (port) on which the message has been received and the MAC address of router that has sent the message (blocks 20 and 30). If no mapping is found in the correspondence table, the switch creates a new entry (line) in the correspondence table, inserting the mapping between the identifier of the input interface on which the "hello" message has been received and the MAC address of the router that has sent the "hello" message, and also saves the received "hello" message in the correspondence table (block 40). If instead a mapping exists in the correspondence table between the input interface on which the message has been received and the MAC address of the router that has sent the message, the "hello" message from this router already present in the correspondence table is replaced by the one just received, so as to update the information relating to this router in such a way that a copy of the last "hello" message intercepted is always saved in the correspondence table (block 50).

FIG. 4 shows an example of a correspondence table relating to switch B in FIG. 2, wherein the first column indicates the switch interfaces, the second column indicates the MAC addresses of the routers connected to the switch interfaces, the third column indicates the saved "hello" message, and each line indicates a mapping between a switch interface and a router connected thereto.

In particular, the received "hello" messages are saved in the correspondence table to allow the switch to emulate the generation of a "hello" message that is semantically correct and consistent with the configuration of the routing protocol, as will be described in detail further on with reference to the flowchart shown in FIG. 7 and relating to the operating phase.

A refresh timer is also associated with each line in the correspondence table. When a new line is created (block 40), the refresh timer is initialized with a predefined value that, for example, could be equal to the value of the dead-interval parameter utilized by the OSPF protocol. Until no new "hello" message is received, the timer is decremented by one unit every second, but when a new "hello" message is received and saved in the correspondence table, the refresh timer associated to the updated line is re-initialized again with the default value (block 50). If the refresh timer becomes equal to zero, the switch understands that there is a loss of connectivity on the considered interface, and the corresponding line is cancelled from the correspondence table.

When the Ethernet switch detects and identifies a loss of connectivity on one of its own interfaces, it carries out the aforementioned operating phase to immediately communicate this information to the IP routers connected thereto.

In particular, according to an aspect of the present invention, this loss of connectivity is communicated to the neighboring routers by means of a fake "hello" message semantically consistent with those sent by the routers. This "hello" message is called "fake" in that it is semantically consistent with those sent by the routers and therefore it is recognized by the other routers as a classical "hello" message, but the content is different from that of a classical "hello" message, as herein below explained.

In routing protocols of the Link State type, such as OSPF and IS-IS, each "hello" message sent by a router typically contains an identifier of the router and the list of the IP neighboring routers from which a "hello" message has already been received, so that each couple of routers can check reciprocal reachability in a straightforward manner. Still according to the present invention, differently from a classical "hello" message generated by a router, a switch generates a fake "hello" message containing "fake information" represented by an empty neighboring router list or, from another point of view, by the absence of a neighboring router list. This fake "hello" message still contains the identifier of a sender router, which is the router connected (directly or through another switch) to the interface where fault has been detected. In case of more than one router connected to such interface, a fake "hello" message is generated for each of these routers.

Generating and sending a fake "hello" message with an empty neighboring router list causes the receiving router to immediately close routing adjacencies with the sending router, triggering the traffic rerouting. This behavior is provided for by both the OSPF protocol and the IS-IS protocol. FIGS. 5 and 6 show a classical "hello" message generated by a router and a fake "hello" message generated by a switch, respectively. In particular, both classical and fake "hello" messages includes records containing IP Packet Header, OSPF Header, Network Mask, Hello Interval, Options, Priority, Dead Interval, Designated Router, Backup Designated Router. The classical "hello" message generated by a router further includes an IP Neighboring Router ID list, i.e., includes an additional record for each neighboring router and containing the corresponding IP neighboring router ID, while the fake "hello" message generated by a switch includes an empty IP Neighboring Router ID list, i.e., does not include any additional record for each neighboring router.

Figure 7:
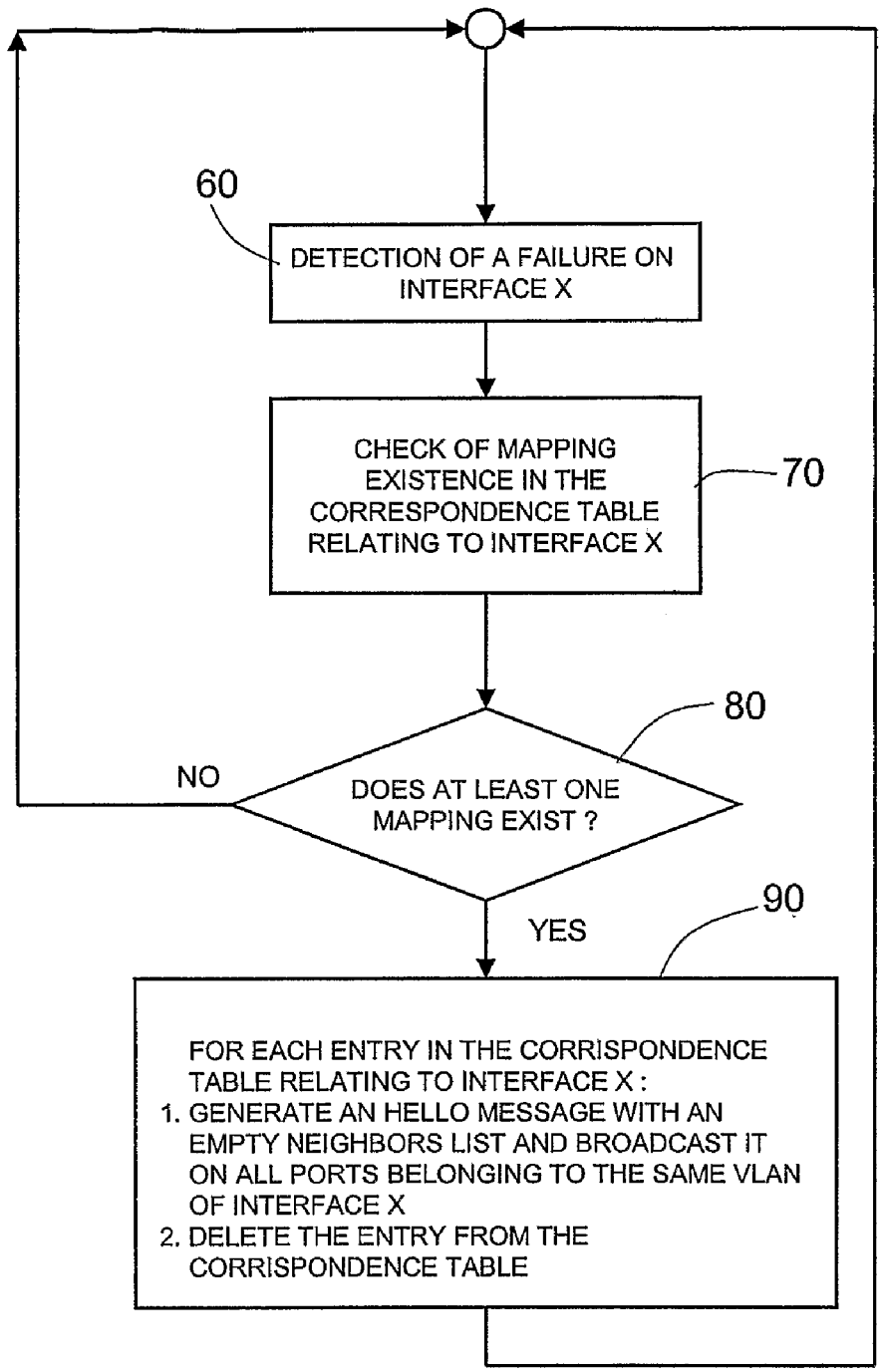
FIG. 7 shows a flowchart of an operating phase of the method according to the present invention.

FIG. 7 shows a flow chart of a possible implementation of the operating phase.

Once an Ethernet switch has detected a link fault (block 60), it checks the number of entries (lines) in the correspondence table which are related to the switch interface involved in the fault, i.e. the number of IP routers reached via this switch interface (blocks 70 and 80). For each mapping associated with this switch interface (i.e. for each router connected, directly or through other switches, to this interface), the switch then uses the corresponding "hello" message to generate a fake "hello" message with an empty neighboring router list (i.e., it deletes the records containing the ID of the neighboring routers), broadcasts it on all its interfaces (ports), and finally deletes the corresponding entry from the correspondence table (block 90). Therefore a fake "hello" message, using the source address of the router on behalf of which the message is sent, is generated for each of the above mentioned IP routers. If the last "hello" message received on the faulty switch interface is stored in the correspondence table, the switch can create the fake "hello" message from this last message, by emptying the neighboring router list, updating the "Size of Datagram" field in the IP header and the "Length" field in the OSPF header, and recomputing the Cyclic Redundancy Check (CRC), which is a well-known field of the Ethernet packet, typically of four bytes, used to detect errors that occur during transmission. In this way, it is guaranteed that the Ethernet switch utilizes updated and semantically correct information, and thus suitable for being opportunely processed by the receiving routers. According to the known routing protocols, the fake "hello" message is sent over the Ethernet local network to a predefined multicast IP address, which causes it to be received and processed by all of the IP routers that participate in the routing protocol. The receiving routers, not seeing their own identifiers in the neighboring router list contained in the fake "hello" message, declare the adjacency with the sending router closed and reroute traffic on a new route. The effect of generating a fake "hello" message by a switch causes the closure of adjacencies with neighboring routers that can no longer be reachable by the routers affected by the fault event, ultimately determining the desired rerouting of traffic, shortening the response times.

With reference again to FIG. 1, in the case of a fault of link $L_{EC}$, the proposed method allows switch C to immediately inform routers A, B, and D of this event by sending a fake "hello" message with router E as the sender and an empty neighboring router list. In order to perform this, switch C first creates an association between interface $I_4$ and router E, via static configuration or intercepting the "hello" messages sent by the router E. When interface $I_4$ is no longer active, switch C is able to inform the other routers in accordance with the already described method.

The advantages of the present invention are evident from the foregoing description. In particular, the present invention allows more rapid and efficient detection of loss of reachability between neighboring routers in a network, by intervening at the switch level only, i.e., without requiring that all of the routers implement the new functionality.

It is clear that numerous modifications and variants can be made to the present invention, all falling within the scope of the invention, as defined in the appended claims.

The invention claimed is:

1. A method for reducing fault detection time in a telecommunication network comprising routers configured to exchange messages via at least one switch, wherein the routers and the at least one switch are at different layers of the Open Systems Interconnection (OSI) model, comprising:
   snooping, by said switch, a message from a router, to extract information from said message; and
   sending, by said switch, a network fault message based on said extracted information,
   wherein said router is a first router and sending a network fault message comprises:
      generating, by said switch, fake information based on said extracted information, said fake information being such as to cause, by a second router different from the first router, closure of connectivity with said first router; and
      sending, by said switch, said network fault message comprising said fake information.

2. The method of claim 1, wherein said extracted information comprises a list of routers reachable by said first router via said switch.

3. The method of claim 2, wherein said fake information comprises an empty list of routers reachable by said first router via said switch.

4. The method of claim 1, wherein sending a network fault message comprises:
   detecting, by said switch, a network fault that prevents said first router from being reachable via said switch; and
   sending, by said switch, said network fault message when said network fault is detected.

5. The method of claim 4, wherein said network fault message is sent to all the other routers connected to said switch.

6. The method of claim 5, wherein sending a network fault message comprises:
   determining routers connected to said switch.

7. The method of claim 6, wherein determining routers connected to said switch comprises:
   generating a correspondence table comprising mappings between interfaces of said switch and routers connected to said interfaces, each mapping comprising an identifier of the router, an identifier of the switch interface, and a message received from said router on said switch interface.

8. The method of claim 6, further comprising determining, by a network operator, the routers connected to said switch.

9. The method of claim 8, wherein generating a correspondence table comprises:
   snooping, by said switch, a message received from a router on a switch interface, to determine an identifier of the router;
   checking, by said switch, for a mapping in said correspondence table between said router and said receiving switch interface;
   if no mapping is found in said correspondence table, creating, by said switch, a new mapping in said correspondence table; and
   if a mapping is found in said correspondence table, replacing, by said switch, the message in said correspondence table with the received message.

10. The method of claim 9, wherein generating a correspondence table further comprises:
   if no message is received from a router for a given time interval, deleting, by said switch, corresponding mapping from said correspondence table.

11. The method of claim 9, wherein sending a network fault message comprises:
   checking, by said switch, for mappings in said correspondence table associated with an unreachable router; and
   for each mapping found, sending, by said switch, a network fault message to the router in the mapping.

12. The method of claim 6, further comprising determining, by said switch, the routers connected to said switch.

13. The method of claim 1, wherein said network is a multiaccess local area network.

14. The method of claim 13, wherein said multiaccess local area network is an ethernet network.

15. A switch for a telecommunication network, capable of being configured to implement the method according to claim 1.

16. A network comprising at least one switch and routers configured to exchange messages via said switch, said switch capable of being configured to implement the method according to claim 1.

17. A switch in a network, the switch storing a software product comprising software portion for implementing the method according to claim 1.

* * * * *